(12) United States Patent
Mathis et al.

(10) Patent No.: US 7,261,499 B2
(45) Date of Patent: Aug. 28, 2007

(54) ADJUSTABLE DRILL MICROSTOP WITH MULTIPLE OFFSET DEPTH SETTINGS

(75) Inventors: Dennis R. Mathis, Tulsa, OK (US); Theodore K. Vogt, Claremore, OK (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 10/986,238

(22) Filed: Nov. 11, 2004

(65) Prior Publication Data

US 2006/0099040 A1   May 11, 2006

(51) Int. Cl.
*B23B 51/08* (2006.01)
*B23B 49/00* (2006.01)

(52) U.S. Cl. .................. 408/202; 408/67; 408/95; 408/241 S

(58) Field of Classification Search .............. 408/202, 408/67, 241 S, 95, 97, 110, 112, 113, 146
See application file for complete search history.

(56) References Cited

U.S. PATENT DOCUMENTS

| | | | | |
|---|---|---|---|---|
| 74,466 | A * | 2/1868 | Whiting ................. | 408/202 |
| 2,224,480 | A * | 12/1940 | Kartarik ................. | 408/81 |
| 2,231,864 | A * | 2/1941 | Abel ....................... | 408/202 |
| 2,301,151 | A * | 11/1942 | Spievak ................. | 408/112 |
| 2,340,941 | A * | 2/1944 | Dietz ..................... | 408/191 |
| 2,402,353 | A * | 6/1946 | Trautmann ............. | 408/112 |
| 2,409,377 | A * | 10/1946 | Miller .................... | 408/112 |
| 2,608,114 | A * | 8/1952 | Martin et al. .......... | 408/112 |
| 2,792,726 | A * | 5/1957 | Vick ...................... | 408/81 |
| 3,028,774 | A * | 4/1962 | Hausser et al. ........ | 408/112 |
| 3,460,408 | A * | 8/1969 | Raymond ............... | 408/112 |
| 3,767,313 | A * | 10/1973 | Bohoroquez et al. .. | 408/14 |
| 3,794,438 | A * | 2/1974 | Knutsson ............... | 408/231 |
| 4,045,874 | A * | 9/1977 | Roman ................... | 433/29 |
| 4,083,646 | A * | 4/1978 | Vindez ................... | 408/133 |
| 4,521,145 | A * | 6/1985 | Bieler .................... | 409/218 |
| 4,802,798 | A * | 2/1989 | Adamson ............... | 408/112 |
| 4,813,822 | A * | 3/1989 | Biek ....................... | 408/14 |
| 4,969,781 | A * | 11/1990 | Fahrner et al. ......... | 408/79 |
| 5,054,968 | A * | 10/1991 | Eckman ................. | 408/97 |

(Continued)

FOREIGN PATENT DOCUMENTS

DE           3828036 A1 *   2/1990

*Primary Examiner*—Monica Carter
*Assistant Examiner*—Michael W. Talbot
(74) *Attorney, Agent, or Firm*—Harness, Dickey & Pierce, P.L.C.

(57) ABSTRACT

An adjustable drill microstop apparatus is employed with a drill and a drill bit to limit the depth of a hole drilled into an object surface by the drill bit. The apparatus has a housing and a nose piece that is mounted for reciprocating axial movement in accordance with a plurality of user selectable depths of cut. The nose piece projects from one end of the housing and is positioned adjacent the object surface to receive the drilled hole. The nose piece has an opening into which the drill bit is inserted, and an engagement surface that engages with the object surface during the drilling operation. During the drilling operation, the drill pushes the nose piece into the housing as the drill bit performs the drilling operation. A pre-selected distance that the nose piece reciprocates in the housing limits the depth of the hole drilled by the drill bit into the object surface.

22 Claims, 5 Drawing Sheets

U.S. PATENT DOCUMENTS 5,096,342 A * 3/1992 Blankenship et al. ....... 408/112
5,649,793 A * 7/1997 Ericksen et al. .............. 408/81
5,746,552 A * 5/1998 Tsui et al. ................ 408/72 B
5,993,453 A * 11/1999 Bullara et al. ................ 606/79
6,162,226 A * 12/2000 DeCarlo et al. .............. 606/80
7,070,364 B2 * 7/2006 Weare ........................ 408/1 R

* cited by examiner

ADJUSTABLE DRILL MICROSTOP WITH MULTIPLE OFFSET DEPTH SETTINGS

BACKGROUND OF THE INVENTION

Description of the Related Art

In drilling holes into surfaces in manufacturing goods, the precise control of the hole depth or countersink depth is often desirable. This is particularly true in the manufacturing of aircraft components where it is often necessary that the head of a fastener inserted into a hole drilled into a surface of the aircraft component be flush with the surface of the component.

Fasteners employed in manufacturing aircraft components such as an aircraft fuselage or a control surface are often countersunk style rivets, screws and pins. Many components require the use of multiple sizes and styles of fasteners. This often requires that an aircraft manufacturing workstation have multiple drills set up for drilling a different countersink depth (and/or countersink angle) for each different fastener used. Thus, a number of different hand drills with different countersink depth setups are required at each workstation. If this manufacturing process could be improved where only one drill is needed to drill several different countersink depth holes, the time and costs associated with the process would be reduced.

SUMMARY

The adjustable drill microstop apparatus allows a single drill to be used in performing the functions of two to six separate drill set ups at a workstation to drill two to six different countersunk holes. The apparatus can be used with a single drill, and can be adjusted to control the single drill to countersink holes in a surface at a variety of different desired depths. The construction of the adjustable drill stop apparatus is inexpensive to manufacture, and is easily operated by the assembly line worker.

In one embodiment, the apparatus includes a cylindrical housing. The housing has a first end that is adapted to be positioned adjacent the drill. A plurality of parallel slots extend through a side wall of the housing. Each slot corresponds to an adjusted depth of a countersunk hole that is drilled using the drill bit stop apparatus. A plurality of anvil surfaces are provided in the interior of the housing.

A nose piece is mounted in a second end of the housing, opposite the housing first end. The nose piece is received in the housing for reciprocating movement in opposite first and second directions relative to the housing. An engagement surface of the nose piece projects from the housing second end. A plurality of stop surfaces are provided on the nose piece. The nose piece is rotatable in the housing to selectively position each stop surface of the nose piece in alignment with an anvil surface of the housing. As the nose piece is moved in the first direction into the housing, the aligned stop surface and anvil surface will abut against each other, thus limiting the distance to which the nose piece can move into the housing. By rotating different stop surfaces into alignment with the anvil surfaces, the distance which the nose piece can be moved in the first direction into the housing is adjusted.

A pin on the nose piece projects through the slots of the housing to indicate the adjusted position of the nose piece relative to the housing, and guide the nosepiece stop surfaces onto the anvil.

A spring is provided in the housing between the nose piece and the first end of the housing. The spring biases the nose piece back toward the second end of the housing.

In use of the adjustable drill bit stop apparatus, the apparatus is first adjusted to limit the drilled depth of a hole by positioning the nose piece pin in the appropriate slot in the housing. A drill having a drill bit is then positioned relative to the apparatus with the drill bit extending through the housing and into the nose piece. The tip of the drill bit is positioned at the desired location of the countersink on the surface of the component. The drilling operation is initiated, and the drill is moved toward the component surface, causing the drill to push the apparatus toward the component surface and causing the nose piece drill engagement surface to engage with the component surface, pushing the nose piece into the housing. The adjusted position of the nose piece in the housing causes one of the nose piece stop surfaces to move in the first direction toward and engage with the anvil surface in the housing. This limits the extent of the nose piece movement through the housing, and thereby determines the depth of the countersunk hole drilled into the component surface by the drill bit.

By moving the nose piece to different adjusted positions in the housing, the length of the nose piece movement in the housing is adjusted and thereby the depth of the countersunk hole drilled into the surface of the component is adjusted.

The individual positions and anvil offsets correspond to the variations in different countersink depths that the microstop is designed to drill. A mechanism and method of globally adjusting the drill depth of all positions in 0.001" (0.0254 mm) increments is integral to the design. In practice the drill depth of one position is adjusted to nominal with the global adjust feature. By design, the drill depth of all of the positions will be correctly adjusted.

BRIEF DESCRIPTION OF THE DRAWINGS

Further features are set forth in the following detailed description of an embodiment of the disclosure and in the following drawing figures wherein.

DETAILED DESCRIPTION

The adjustable drill microstop apparatus of the present disclosure is constructed of a minimum number of parts to facilitate its use at a workstation in limiting the depth of a hole and/or countersink drilled in the surface of a component being manufactured. In one embodiment, the basic component parts of the apparatus include a housing and a nose piece that is mounted in the housing for reciprocating movement. The construction of the housing and nose piece limit the reciprocating movement of the nose piece in the housing to three pre-selected distances. It should be understood that modifications to the apparatus are possible where the extent of movement of the nose piece in the housing can be adjusted to a plurality of different distances to adjust a hole being drilled using the apparatus to a plurality of different depths. In one embodiment, each of the component parts of the apparatus is constructed of a metal. However, other materials may be used depending on the intended uses of the apparatus.

Figure 1:
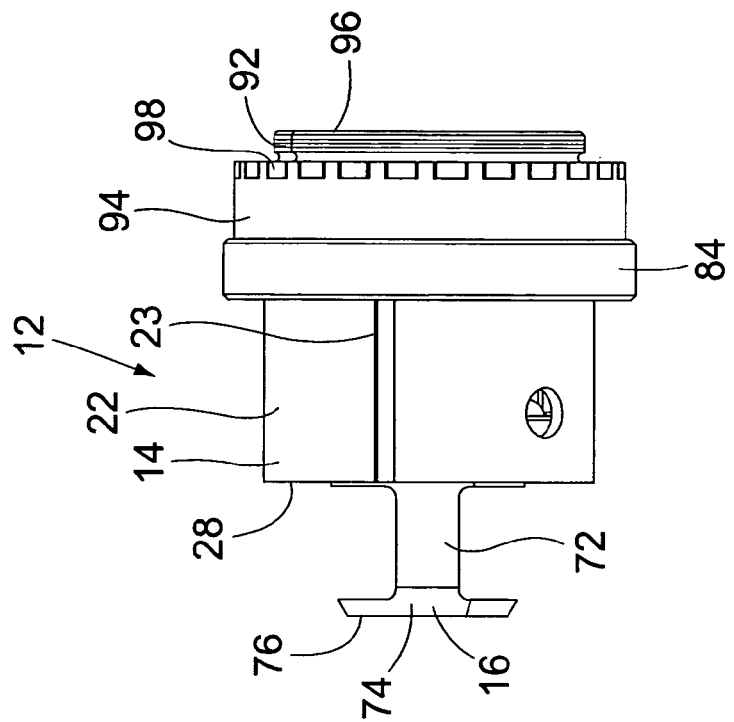
FIG. 1 is a housing end perspective view of the adjustable drill microstop apparatus of the present disclosure.
Figure 2:
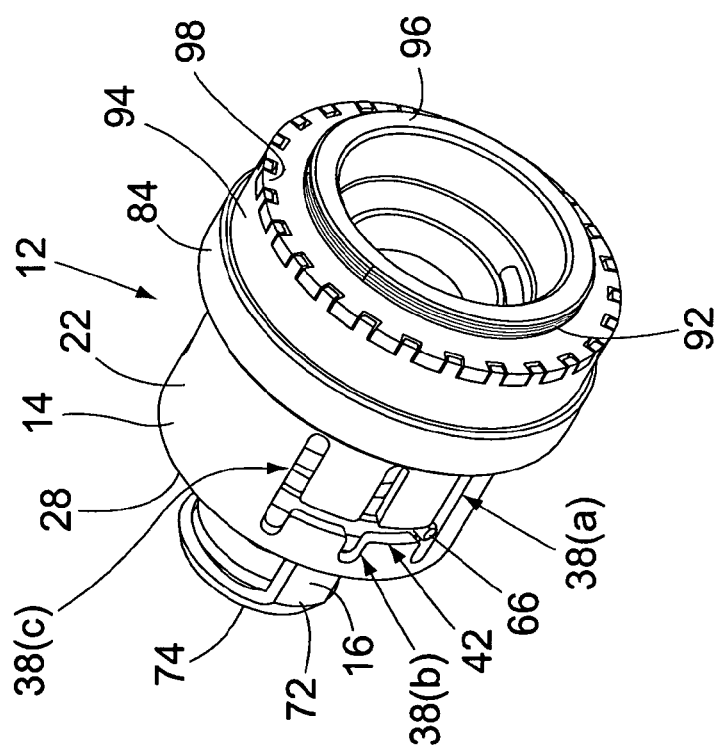
FIG. 2 is a side view of the apparatus.
Figures 3, 4, 5:
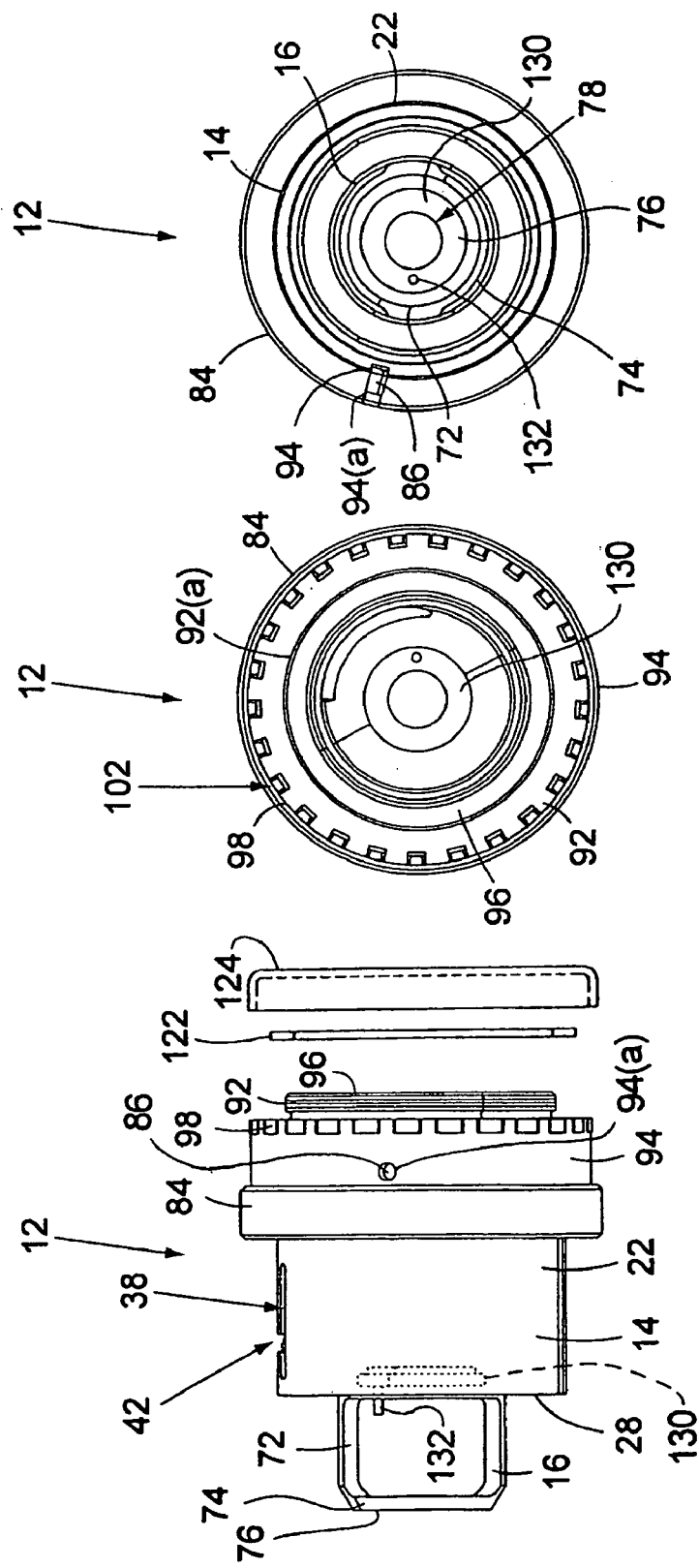
FIG. 3 is a side view of the apparatus rotated 90 degrees from FIG. 2.
FIG. 4 is a housing end view of the apparatus.
FIG. 5 is a nose piece end view of the apparatus.
Figure 7:
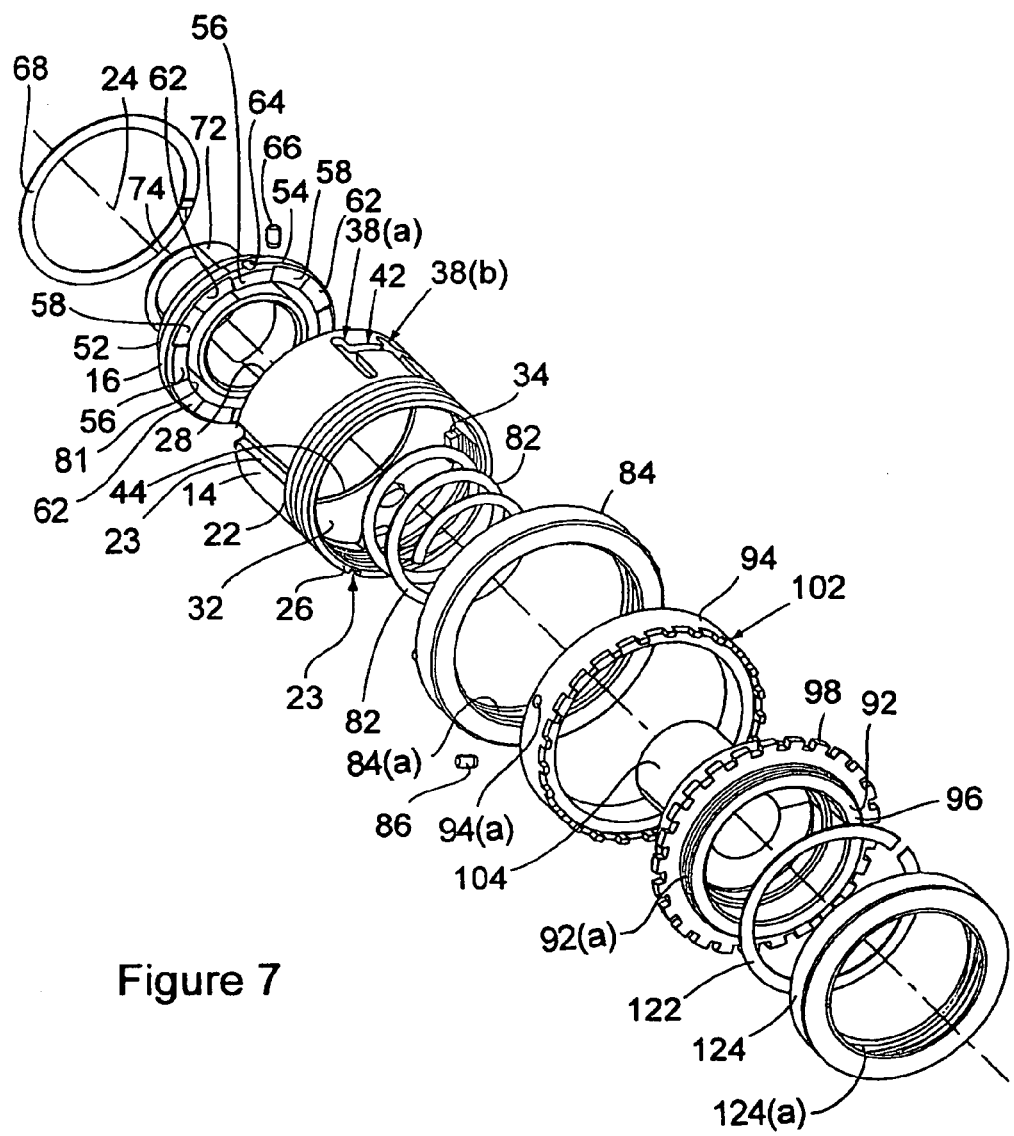
FIG. 7 is an exploded housing end perspective view of the component parts of the apparatus; and, FIG. 8 is an exploded nose piece end perspective view of the component parts of the apparatus.

FIG. 1 is a housing end perspective view of the apparatus 12 of the invention. FIG. 7 is a view similar to that of FIG. 1, but with the component parts of the apparatus 12 disassembled. The apparatus 12 includes a housing 14 and a nose piece 16 that is assembled into the housing for reciprocating movements in opposite first and second directions.

Figure 6:
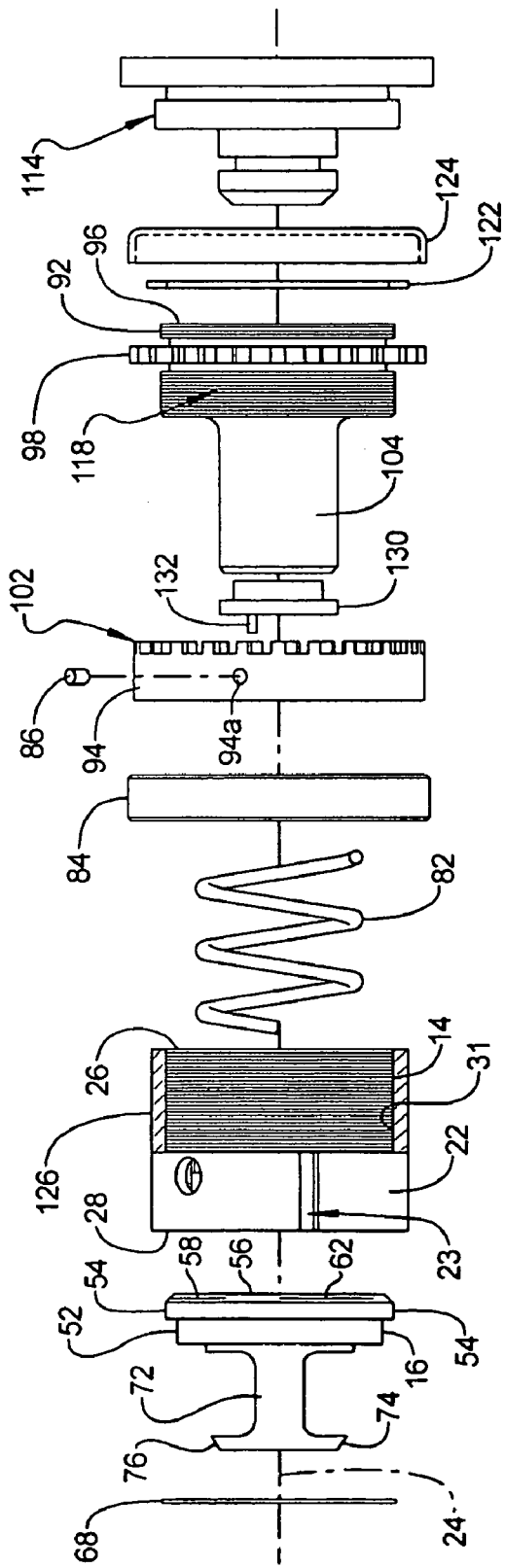
FIG. 6 is an exploded side view of the component parts of the apparatus.

Referring further to FIGS. 1, 6 and 7, the housing 14 has a cylindrical sidewall 22 having a center axis 24 and axially opposite first 26 and second 28 ends. The housing 14 has an interior surface 31 with a portion forming a cylindrical threaded interior surface 32.

Figure 8:
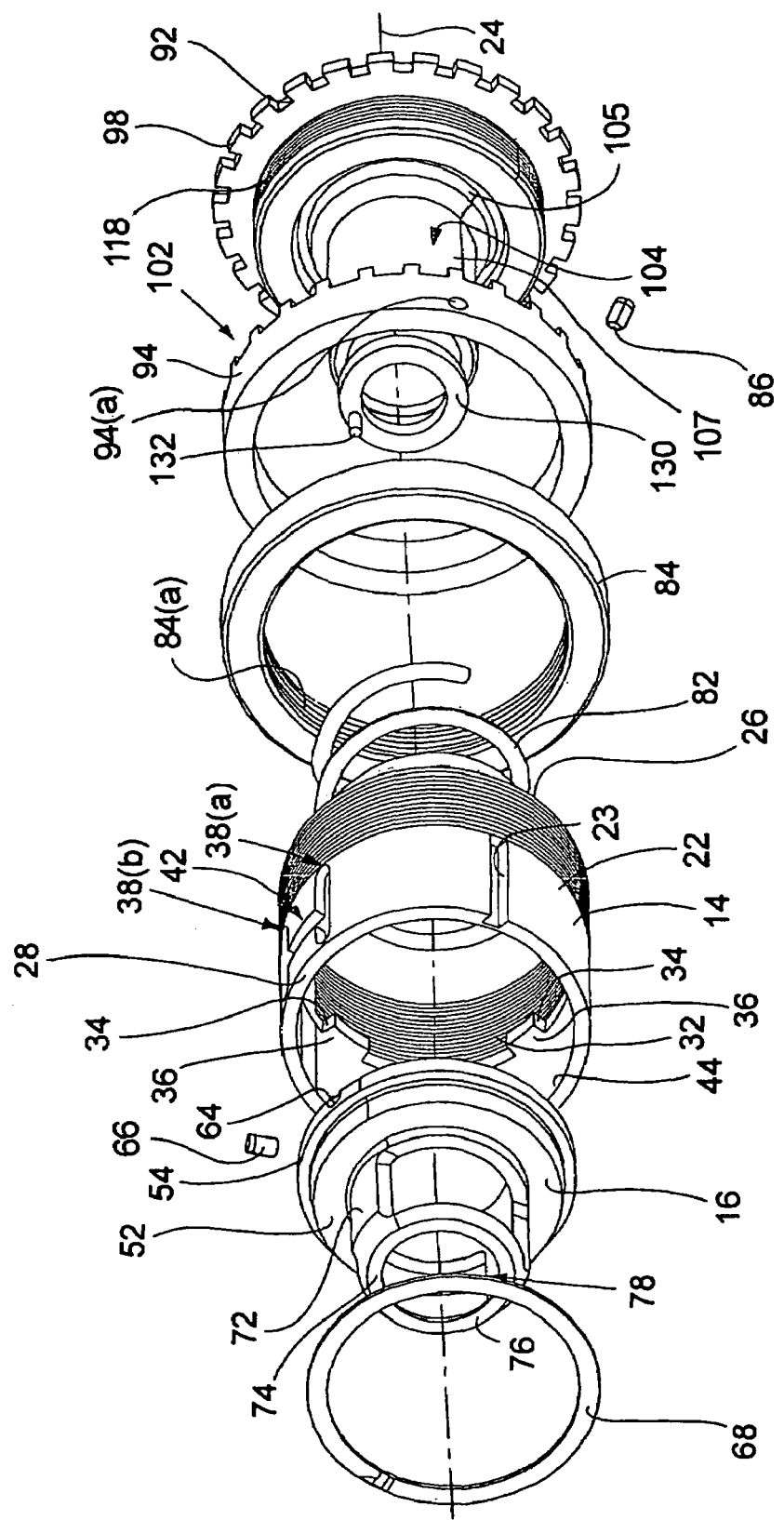

A Referring to FIGS. 7 and 8, a plurality of anvils 34 project radially inwardly from the housing 14 interior adjacent the threaded interior surface 32. In the illustrative embodiment there are four anvils 34. Each of the anvils 34 is positioned at the same axial distance on the housing interior surface 32 measured in a first direction extending through the housing interior bore from the housing second end 28 toward the housing first end 26. A second (opposite) direction through the housing interior bore is from the housing first end 26 toward the housing second end 28. Each of the housing anvils 34 has an anvil surface 36 (FIG. 8) that faces toward the housing second end 28.

A Referring to FIG. 1, plurality of axially extending slots 38(a)(b)(c) are formed through the housing sidewall 22. Each of the slots 38 extends parallel with the housing center axis 24. Each of the slots 38 has a first end positioned adjacent the housing first end 26, and an opposite second end positioned adjacent the housing second end 28.

A transverse slot 42 extends through the housing sidewall 22 and intersects the axial slots 38(a)(b)(c); The transverse slot 42 intersects the axial slots 38 intermediate the opposite first and second ends of each axial slot.

Referring to FIG. 8, interior groove 44 is formed around the interior surface 31 of the housing. The groove 44 is positioned adjacent the housing second end 28.

The nose piece 16 has a cylindrical head 52 with an outer cylindrical surface 54 that is received in the housing interior surface 32 for sliding, reciprocating movements in the opposite first and second directions. The annular end face of the nose piece head 52 is divided into four sets of three stop surfaces 56, 58, 62. Each of the first stop surfaces 56 is set at the same position along the axial length of the nose piece 16. Each of the second stop surfaces 58 is set at the same distance along the axial length of the nose piece 16. Each of the third stop surfaces 62 is set at the same distance along the axial length of the nose piece 16. Thus, the first stop surfaces 56 are all positioned in one plane, the second stop surfaces 58 are positioned in one plane, and each of the third stop surfaces 62 are positioned in one plane, and each of the planes are axially spaced from each other and are positioned perpendicular to the center axis 24 of the housing 14.

The nose piece outer surface 54 also mounts the nose piece 16 for rotary movement in the housing 14. A pin hole 64 (FIG. 7) is provided in the nose piece outer surface 54 and a pin 66 is assembled into the pin hole 64. With the nose piece 16 assembled into the housing 14, the nose piece pin 66 projects outwardly and is able to engage with any of the slots 38(a)(b)(c), and slot 42, in the housing sidewall 22. The pin 66 is dimensioned to move axially through each of the housing axial slots 38(a)(b)(c) on reciprocating movement of the nose piece 16 in the opposite first and second directions in the housing 14. The pin 66 is also dimensioned to move through the housing transverse slot 42 on rotary movement of the nose piece 16 in the housing 14.

With the nose piece head 52 assembled into the interior of the housing sidewall 22, a snap ring 68 (FIG. 7) is assembled into the housing sidewall interior groove 44. This limits the reciprocating movement of the nose piece head 52 between the anvils 34 and the snap ring 68 in the interior bore of the housing sidewall 22. Furthermore, depending on the rotary adjusted position of the nose piece 16 in the housing 14, the distance that the nose piece 16 can be moved through the interior of the housing 14 is adjusted between three separate preset distances. With the nose piece pin 66 in the first axial slot 38(a), the nose piece 16 can be moved in the first direction through the housing 14 until the first stop surfaces 56 engage with the anvil surfaces 36. With the first stop surfaces 56 projecting the greatest extent from the nose piece head 52, the distance that the nose piece 16 travels in the first direction in the housing 14 with the nose piece pin 66 in the first slot 38(a) is the smallest distance traveled.

Moving the nose piece pin 66 to the second slot 38(b) positions the nose piece stop surfaces 58 axially opposite the anvil surfaces 36. Moving the nose piece 16 in the first direction will be limited by the engagement of the nose piece stop surfaces 58 against the anvil surfaces 36. Thus, the nose piece with the nose piece pin 66 in the second axial slot 38(b) moves a second distance in the first direction that is slightly greater than the first distance.

With the nose piece pin 66 in the third slot 38(c), the stop surfaces 62 are positioned axially opposite the anvil surfaces 36. The nose piece 16 can now be moved in the first direction until the stop surfaces 62 engage with the anvil surfaces 36. Thus, with the pin 66 in the third slot 38(c), the nose piece can move its greatest distance in the first direction through the housing 14.

Referring further to FIGS. 6, 7 and 8, two or more flanges 72 project axially from the nose piece head 52 out of the housing second end 28. The flanges 72 extend to an annular orienting collar 74 on the nose piece 16. The collar 74 has an engagement surface 76 at its axially outermost end. The engagement surface 76 surrounds a drill bit opening 78 through the collar. The drill bit opening 78 is dimensioned to provide clearance for a drill bit extending through the housing 14 and the nose piece 16.

A coil spring 82 is assembled into the interior of the apparatus housing 14. The coil spring 82 is dimensioned to surround a drill bit inserted through the housing 14. The coil spring 82 extends through the housing and engages against the nose piece 16 at one end of the spring. In one embodiment, the nose piece 16 is provided with an annular groove 81 (FIG. 7) in the nose piece head 52 just inside of the stop surfaces 56, 58, 62 to receive the end of the spring 82. A housing end face tube 104 is provided with an annular groove 105 outside of a cylindrical surface 107 thereof to receive the opposite end of the spring 82 (FIG. 8). The compressed axial length of the coil spring 82 is slightly less than the axial distance between nosepiece groove 81 and groove 105 in housing end face tube 104. The spring 82 geometry such as length, number of coils, and wire diameter can be used to tailor the compressive load vs displacement of the nosepiece 16.

A Referring to FIGS. 6 and 8, a circular hand ring 84 with internal threaded surface 84a is assembled over an exterior threaded surface 126 of the housing 14. The hand ring 84 threaded configuration enables the hand ring to be rotated and retracted from a locking ring 94. A plurality of dentil projections 98 are formed radially outwardly from the peripheral edge of a housing end face 92 of the end face tube 104 and engage in notches 102 around the periphery of one edge of the locking ring 94 to prevent the rotation of the locking ring 94 relative to housing 14. Retracting circular hand ring 84 and sliding back locking ring 94 unlocks the global drill depth adjustment. The locking ring 94 is assembled over the exterior surface of the housing 14 at the housing first end 26. A pin 86 is employed in a hole 94a of the locking ring 94 to prevent rotation of the locking ring 94 about the surface 22 of housing 14.

The end face tube 104 and the locking ring 94 are secured together and assembled to the first end 26 of the housing 14. As seen in the drawing figures, the housing end face 92 is generally cylindrical and has an annular end surface 96. The end surface 96 is positioned adjacent a drill in use of the apparatus 12.

The cylindrical surface 107 of the end face tube 104 projects from the housing end face 92 into the interior of the housing 14. The end face tube 104 projects through the center of the spring 82 and into the cylindrical interior bore of the nose piece head 52. The cylindrical portion 107 of the end face tube 104 reciprocates in the interior bore of the nose piece head 52 as the nose piece 16 reciprocates in the housing 14.

With the adjustable drill stop apparatus 12 assembled as described above, a locking 122 engages with a groove 114b on a portion of a drill housing 114. This holds a retaining ring 124 to the drill house 114. The apparatus can then be used in setting the depth of holes drilled into a component part surface by a drill. The apparatus, 12 is removed from the drill by unthreading retaining ring 124 (FIGS. 7 and 8) from a threaded portion 92a adjacent to housing end face 92 of end face tube 104. A bit is then able to be inserted into a drill chuck 114a supported from the housing 114. The apparatus 12 is then reinstalled on the drill by threading a threaded surface 124a of retaining ring 124 onto the threaded portion 92a of housing end face 92 of end face tube 104. The drill bit extends through the interior of the housing 14 and through the drill bit opening 78 with the tip of the bit projecting adjacent the nose piece engagement surface 76. The apparatus 12 is positioned with the tip of the drill bit positioned adjacent the component surface at the site of the hole to be drilled. The drill is activated and moved toward the component surface, causing the drill to push the nose piece engagement surface 76 into contact with the component. Further movement of the drill and drill bit toward the component surface causes the drill bit tip to contact the surface to begin the drilling operation. Further movement of the drill causes the nose piece 16 to move in the first direction through the interior of the apparatus housing 14.

A calibration of the microstop drill depth is then performed by checking the depth of the hole or countersink and comparing to one of the predetermined depths. Adjustments are made by unthreading circular hand ring 84 away from locking ring 94. Locking ring 94 is moved away from dentil projections 98 to disengage them from the end face tube 104. The notches 102a in surface 102 represent 0.001 inch change to all of the predetermined depths. By rotating the locking ring 94 clockwise or counterclockwise, the pin 86, which is engaged in slot 23 (FIG. 6), causes the cylindrical threaded interior surface 32 to move axially along the center axis 24 about the threaded surface 118 (FIG. 8) on end face tube 104. The notches 102a in surface 102 are counted as they rotate past the dentil projections 98. When the appropriate change has been made, locking ring 94 is moved to engage the notches of surface 102 98. Circular hand ring 84 is threaded back into contact with the locking ring 94 to secure it in its new position.

Pin 132 of a chip breaker 130 is used to break long strands of spinning drill chips to prevent a buildup of chips in the mechanism. The chip breaker 130 is seated in the end face tube 104.

The distance that the nose piece 16 moves in the housing 14 determines the depth of the hole drilled into the surface of the component. Pin 66 in one of slots 38a, 38b and 38c guides the nose piece 16 onto the anvil surfaces 36. Depending on the rotary adjusted position of the nose piece 16 in the housing 14, the apparatus 12 of the invention sets the depth of the hole drilled into the component at one of three pre-determined depths.

As explained earlier, although the apparatus 12 is described above as having three stop surfaces for setting three, preset depths of countersunk holes, the apparatus can be modified with fewer or more stop surfaces on the nose piece 16 and fewer or more axial slots in the housing 14 to enable the apparatus 12 to be used in controlling the drilling of holes at a plurality of preset depths. Slots 38(a), (38(b), 38(c) and pin 66 can be replaced by magnets to maintain alignment of the anvil 36 surfaces with the housing 14 to reduce chance of contaminants getting into interior mechanisms.

Although the apparatus has been described above by reference to a specific embodiment, it should be understood that modifications and variations could be made to the apparatus described without departing from the intended scope of the appended claims.

The invention claimed is:

1. An adjustable drill bit stop apparatus for limiting movement of a bit projecting from a drill in drilling a hole in an object, the apparatus comprising:

a housing having an interior bore through the housing and at least one anvil on the housing;

a nose piece rotationally mounted in the housing bore for reciprocating axial movement of the nose piece in opposite first and second axial directions through the housing bore;

an object engagement surface and an opening formed on the nose piece, where inserting a bit on a drill through the housing and into the nose piece opening causes the drill to push the housing and engage the object engagement surface of the nose piece with the object and push the nose piece in the first direction through the housing interior bore; and a plurality of circumferentially arranged stop surfaces formed on an interior surface of the nose piece, the stop surfaces each operating to limit axial movement of the nose piece to a different axial distance, a pin operably associated with the nose piece and said housing for keying the nose piece to the housing to thus select one of said stop surfaces for use; where the selected one of stop surfaces engages with the anvil as the nose piece is moved in the first direction through the housing bore, and prevents further movement of the nose piece in the first direction limiting the movement to a first distance, and thus limiting the depth of travel of the drill bit to one of a plurality of determined depths.

2. The apparatus of claim 1, further comprising:

a spring in the housing biasing the nose piece in the second direction.

3. The apparatus of claim 1, further comprising:
the housing having a side wall that extends around the housing interior bore;
a slot in the housing side wall; and,
said pin projecting from the nose piece into the slot where the pin moves along the slot in response to the nose piece reciprocating in the first and second directions through the housing bore.

4. The apparatus of claim 3, further comprising:
the slot being one of a plurality of slots in the housing side wall, each said slot being uniquely operatively associated with one of said stop surfaces; and,
the nose piece being movable in the housing bore to position the pin in a selected slot of the plurality of slots where the pin moves along the selected slot in response to the nose piece reciprocating in the first and second directions through the housing bore.

5. The apparatus of claim 4, further comprising:
a transverse slot interconnecting the plurality of slots; and,
the pin being movable through the transverse slot to position the pin in each of the plurality of slots.

6. The apparatus of claim 1, further comprising:
the nose piece being adjustably positionable in the housing bore to rotationally move the nose piece to the position where the selected stop surface engages the anvil when the nose piece is moved in the first direction through the housing bores, and to move the selected stop surface to a position where the selected stop surface will not engage with the anvil when the nose piece is moved in the first direction through the housing bore.

7. The apparatus of claim 1, further comprising:
one of the stop surfaces forming a second stop surface on the nose piece that is circumferentially offset from the first stop surfaces; and,
the nose piece being rotationally, adjustably positionable in the housing bore to selectively move the selected stop surface to the position where the selected stop surface engages with the anvil when the nose piece is moved in the first direction through the housing bore, and to move the nose piece to a rotational position where the second stop surface engages with the anvil as the nose piece is moved in the first direction through the housing bore and prevent further movement of the nose piece in the first direction, thus limiting the axial movement of the nose piece to a second distance that is different from the first distance.

8. The apparatus of claim 7, further comprising:
a housing end face tube that is connected to the housing for movement of the end face tube to a plurality of adjusted positions of the end face tube relative to the housing and relative to the anvil, whereby each adjusted position of the end face tube adjusts depths of holes that can be drilled by the nose piece moving the first and second distances.

9. The apparatus of claim 8, further comprising:
a retaining ring that is attachable to a drill and to the housing end face tube for attaching the apparatus to the drill, whereby the nose piece is movable in the first and second distances relative to the drill.

10. The apparatus of claim 1, further comprising:
the stop surfaces including a plurality of first separate stop surfaces, a plurality of second stop surfaces, and a plurality of third stop surfaces on the nose piece; and,
the nose piece being rotationally, adjustably positionable in the housing bore to selectively move said stop surfaces to a position where one of said first, second and third stop surfaces engages with the anvil when the nose piece is moved in the first direction through the housing bore, and to prevent further movement of the nose piece in the first direction, thus limiting the axial movement of the nose piece to a plurality of different distances with each said distance associated with each said first, second and third pluralities of stop surfaces being different.

11. The apparatus of claim 1, further comprising:
a housing end face tube that is connected to the housing for movement of the end face to a plurality of adjusted rotational positions of the end face tube relative to the housing and relative to the anvil, whereby each adjusted position of the end face tube adjusts a depth of a hole that can be drilled by the nose piece moving axially the first distance.

12. The apparatus of claim 11, further comprising:
a retaining ring that is attached to a drill and is attachable to the housing end face tube for attaching the apparatus to the drill with the housing held at a fixed position relative to the drill.

13. The apparatus of claim 12, further comprising:
the retaining ring being manually removably attachable to the housing end face tube, thus enabling removal of the housing from the drill and replacement of the drill.

14. The apparatus of claim 11, further comprising:
a plurality of dentil projections projecting from the housing end face tube, each said dentil projection defining one of the adjusted rotational positions of the end face tube relative to the housing.

15. The apparatus of claim 14, further comprising:
a locking ring having a plurality of notches adapted to engage the plurality of dentil projections, the locking ring being movable to engage the plurality of dentil projections with the plurality of notches and to lock the end face tube in one of the adjusted rotational positions.

16. The apparatus of claim 1, further comprising:
a chip breaker positioned adjacent the nose piece to obstruct chips of drilled material from entering into the housing interior bore.

17. The apparatus of claim 16, further comprising:
a pin that projects from the chip breaker to break strands of chips of drilled material.

18. The apparatus of claim 16, further comprising:
the chip breaker having a center hole dimensioned to receive the drill bit.

19. An adjustable drill bit stop apparatus for limiting movement of a bit projecting from a drill, the apparatus comprising:
a housing having an interior bore through the housing and a side wall that extends around the housing interior bore;
a nose piece mounted in the housing interior bore for reciprocating axial movement of the nose piece in opposite first and second directions through the housing interior bore, and for rotational movement of the nose piece relative to the housing interior bore between a plurality of different rotary positions, the nose piece being movable a different axial distance in the first and second directions through the housing interior bore in each different rotary position of the nose piece in the housing interior bore; and,
a plurality of stop surfaces formed on an internal surface of the nose piece for selectively engaging stop structures arranged circumferentially on an interior surface of said housing interior bore;

said stop surfaces each having a different dimension;

a member for keying said nose piece to said housing to select one of said stop surfaces for use, such that said dimension of said selected stop surface controls axial movement of said nose piece to a pre-determined distance; and an object engagement surface and an opening positioned on the nose piece where inserting a bit on a drill through the housing and into the nose piece opening will cause the drill to push the apparatus and engage the drill engagement surface of the nose piece with the object, and push the nose piece in the first direction through the housing interior bore.

20. The apparatus of claim 19, further comprising:

a spring in the housing interior bore biasing the nose piece in the second direction.

21. The apparatus of claim 19, further comprising:

a plurality of slots in the housing side wall; and, a pin projecting from the nose piece and into one slot of the plurality of slots, the pin being movable to each slot of the plurality of slots by rotating the nose piece in the housing interior bore.

22. An adjustable drill bit stop apparatus secureable to a drill, for limiting an axial distance of movement of a bit projecting from the drill into a work surface during a drilling operating, the apparatus comprising:

a housing having a side wall defining an interior bore;

at least one anvil disposed on said interior bore of said housing;

a nose piece having a plurality of stop surfaces arranged circumferentially about an internal surface portion, each of said stop surfaces having different thicknesses in an axial direction that cooperate with said housing to limit a depth of travel of said drill bit to one of a plurality of different, predetermined axial depths during a drilling operation, said nose piece being at least partially housed within said housing and movable axially relative to said housing;

an end face tube secured to said housing at a first portion thereof and being secureable to said drill at a second portion thereof;

a biasing member disposed between said end face tube and said nose piece; and said nose piece being axially moveable against a biasing force of said biasing member, and rotationally moveable relative to said housing into one of a plurality of rotational positions relative to said housing, to cause engagement of a selected one of said stop surfaces with said anvil, to thus enable a setting of a depth of travel of said drill bit to one of said predetermined plurality of axial depths.

* * * * *